WATSON & TINKEL.
Grain Winnower.
No. 89,526.                     Patented April 27, 1869.
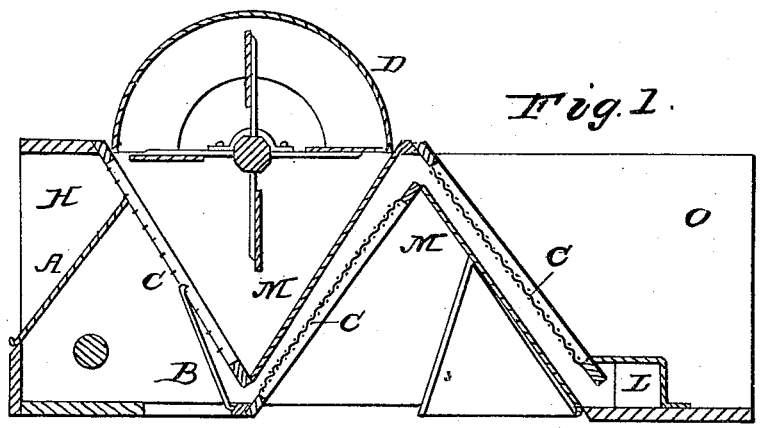
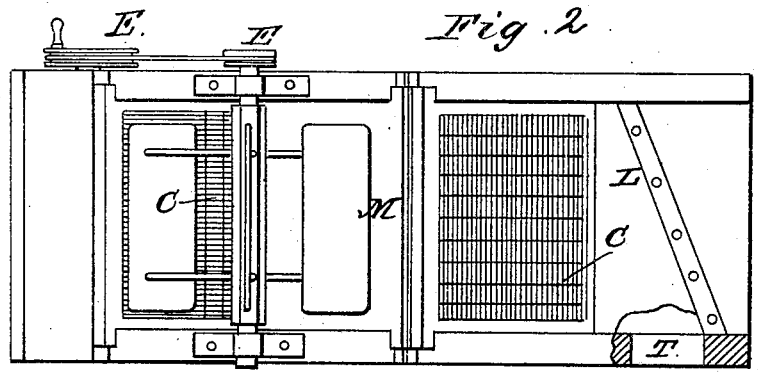
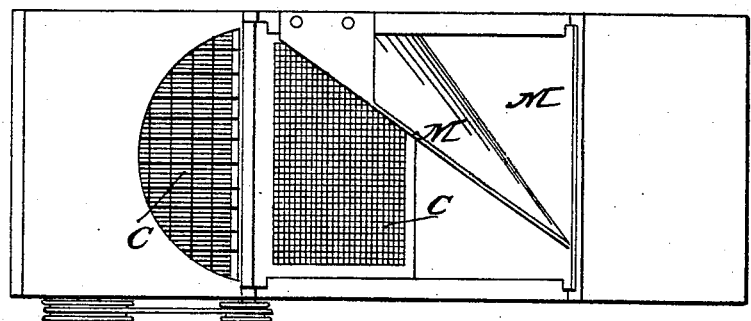

BENJAMIN F. WATSON AND CHARLES H. TINKEL, OF BRIDGEPORT, ILLINOIS.

Letters Patent No. 89,526, dated April 27, 1869.

IMPROVEMENT IN MACHINE FOR SCREENING GRAIN AND SEED.

The Schedule referred to in these Letters Patent and making part of the same.

*To all whom it may concern:*

Be it known that we, BENJAMIN F. WATSON and CHARLES H. TINKEL, of Bridgeport, in the county of Lawrence, and State of Illinois, have invented a new and improved Machine for Screening Grain and Seeds; and we do hereby declare that the following is a full, clear, and exact description of the construction and operation of the same, reference being had to the annexed drawing, making a part of this specification, in which—

Figure 1 is a transverse vertical section;
Figure 2, a front elevation; and
Figure 3, a rear elevation.

In the drawing—

Fig. 1, O represents the frame of our improvement, which will be ordinarily about five feet high, but when used in mills and elevators, it may extend from one floor to the other, or be of such height as parties may desire.

H represents the hopper, in which there is a slide, A, to govern the feed of the grain or seed.

B represents a series of wires, hooked on the first screen to let all substances larger than the grain slide off at the opening T.

C C C represent screens, or sieves, which slide into the frame O, in grooves, and at such an angle as will cause the grain to descend rapidly. Said screens are so arranged that they can be taken out and other screens of a different grade put in, in order to clean all kinds of seeds or grain.

D is a drum, in which is a fan, which occupies the space between the first screen and the first slide-board M, in order to fan the grain while passing over the first screen.

E E represent pulleys, or cog-wheels, by which the fan is driven.

M M, boards fastened in the frame O, parallel to the screens C, in order to convey off all foreign substances that may fall through the screens C C.

L represents a spout.

It will be seen that this arrangement is an automatic one, and all that is required is to pour the grain or seed into the hopper H, and the grain or seed will pass through the machine rapidly, and out at the spout L, by its own gravity.

It is also obvious that the machine will be complete and answer without the drum D and the fan, but this may be attached if parties desire.

We claim the combination and arrangement of the slide A, wires B, screens C, and boards M M, in the manner and for the purpose set forth.

BENJAMIN F. WATSON.
CHARLES H. TINKEL.

Witnesses:
M. A. SHEPARD,
JOHN C. GERRISH.